United States Patent
He et al.

(10) Patent No.: US 11,438,051 B2
(45) Date of Patent: Sep. 6, 2022

(54) PRECONFIGURED ANTENNA BEAMFORMING

(71) Applicant: Google LLC, Mountain View, CA (US)

(72) Inventors: Fei He, Sunnyvale, CA (US); Michael Kincaid, Mountain View, CA (US)

(73) Assignee: Google LLC, Mountain View, CA (US)

(*) Notice: Subject to any disclaimer, the term of this patent is extended or adjusted under 35 U.S.C. 154(b) by 64 days.

(21) Appl. No.: 16/982,255

(22) PCT Filed: Jul. 19, 2019

(86) PCT No.: PCT/US2019/042679
§ 371 (c)(1),
(2) Date: Sep. 18, 2020

(87) PCT Pub. No.: WO2021/015722
PCT Pub. Date: Jan. 28, 2021

(65) Prior Publication Data
US 2021/0320708 A1    Oct. 14, 2021

(51) Int. Cl.
*H04B 7/06*  (2006.01)
*H04B 17/318* (2015.01)
*H04B 7/08*  (2006.01)

(52) U.S. Cl.
CPC ......... *H04B 7/0695* (2013.01); *H04B 7/0617* (2013.01); *H04B 7/088* (2013.01); *H04B 17/318* (2015.01)

(58) Field of Classification Search
CPC .... H04B 7/0695; H04B 7/0617; H04B 7/088; H04B 17/318

USPC .................................................... 375/267
See application file for complete search history.

(56) References Cited

U.S. PATENT DOCUMENTS

| | | | |
|---|---|---|---|
| 9,368,869 B2 | 6/2016 | Chen et al. | |
| 9,793,605 B1 | 10/2017 | Desclos et al. | |
| 2015/0236411 A1* | 8/2015 | Garrett | H04B 7/0617 370/338 |
| 2018/0006379 A1 | 1/2018 | Cariou et al. | |

OTHER PUBLICATIONS

International Search Report and Written Opinion of International Application No. PCT/US2019/042679, dated Jun. 23, 2020, 20 pp.

(Continued)

*Primary Examiner* — Fitwi Y Hailegiorgis
(74) *Attorney, Agent, or Firm* — Shumaker & Sieffert, P.A.

(57) ABSTRACT

System and techniques are provided for preconfigured antenna beamforming. A device having a first antenna system for communicating over a first wireless link and a second antenna system for communicating over a second wireless link may be provided. For different transmit power levels of the first and/or second wireless links, an antenna coupling factor between the first antenna system and the second antenna system may be measured for different beamforming configurations of the first antenna system, a received signal strength indicator (RSSI) of the first and/or second wireless link may be measured for the different beamforming configurations of the first antenna system, and a beamforming configuration at each of the different transmit power levels with the measured antenna coupling factor and the measured RSSI may be stored in a memory as a predefined beamforming configuration.

17 Claims, 11 Drawing Sheets

(56) References Cited

OTHER PUBLICATIONS

Invitation to Pay Additional Fees from International Application No. PCT/US2019/042679, dated Mar. 9, 2020, 14 pp.
International Preliminary Report on Patentability from International Application No. PCT/US2019/042679, dated Feb. 3, 2022, 12 pp.

* cited by examiner

FIG. 3

Predetermined Beamforming Configuration Data
220

| RSSI of 4G LTE | Tx Power of 5G NR FR2 | Coupling factor | beamforming black out region/angle range |
|---|---|---|---|
| xxdBm | xxdBm | x | region/angle range 1 |
| xxdBm | xxdBm | y | region/angle range 2 |
| xxdBm | xxdBm | z | region/angle range 3 |
| xxdBm | xxdBm | a | No Blackout |

| Tx power of 4G LTE | RSSI of 5G NR FR2 | Coupling factor | beamforming black out region/angle range |
|---|---|---|---|
| xxdBm | xxdBm | x' | region/angle range 4 |
| xxdBm | xxdBm | y' | region/angle range 5 |
| xxdBm | xxdBm | z' | region/angle range 6 |
| xxdBm | xxdBm | a' | No Blackout |

310 → (points to first table)
320 → (points to second table)

PRECONFIGURED ANTENNA BEAMFORMING

BACKGROUND

Computing devices may include multiple types of radio, with various antennas, to support different types of wireless communication links. Different radios may operate at the same time which may result in antenna coupling, affecting the usability of the computing device.

BRIEF SUMMARY

According to an embodiment of the disclosed subject matter, beamformed wireless communication of a device including a first antenna system for communicating over a first wireless link and a second antenna system for communicating over a second wireless link may be configured. A beamforming configuration may be determined for the first antenna system based on predefined beamforming configurations where the beamforming configuration does not direct a beam for transmitting through blackout regions for the second antenna system defined in the predefined beamforming configurations at transmit power levels associated with the blackout regions. The first antenna system may be configured in accordance with the selected beamforming configuration. The first wireless link may be communicated over using the configured first antenna system and second wireless link may be communicated over using the second antenna system.

The beamforming configuration may not direct a beam for receiving through blackout regions for the second antenna system defined in the predefined beamforming configurations and associated with transmit power levels of the second antenna system when the second antenna system is operating at the associated transmit power levels.

The predefined beamforming configurations may define different transmission and receiving angles for the beam of the first antenna system.

The first antenna system may include an antenna array.

The first wireless link and the second wireless link may correspond to different radio access networks.

The first wireless link may operate in a frequency range above 24 GHz, and the second wireless link may operate in a frequency range below 6 GHz.

A signal strength indicator may be determined for each of the first and second wireless links. The determined signal strength indicator for one of the first and second wireless links may be a received signal strength indicator, and the determined signal strength indicator for the other one of the first and second wireless links may be a transmission power.

A device may include a first antenna system for communicating over a first wireless link and a second antenna system for communicating over a second wireless link. The device may determine a beamforming configuration for the first antenna system based on predefined beamforming configurations where the beamforming configuration may not direct a beam for transmitting through blackout regions defined in the predefined beamforming configuration at transmit power levels associated with the blackout regions. The device may configure the first antenna system in accordance with the selected beamforming configuration. The device may communicate over the first wireless link using the configured first antenna system and over the second wireless link using the second antenna system.

The beamforming configuration may not direct a beam for receiving through blackout regions defined in the plurality of predefined beamforming configurations and associated with transmit power levels of the second antenna system when the second antenna system is operating at the associated transmit power levels.

The predefined beamforming configurations may define different transmission and receiving angles for the beam of the first antenna system.

The first antenna system may include an antenna array.

The first wireless link and the second wireless link may correspond to different radio access networks.

The device according to any of claims 9 to 13, wherein the first wireless link operates in a frequency range above 24 GHz, and the second wireless link operates in a frequency range below 6 GHz.

A signal strength indicator may be determined for each of the first and second wireless links. The determined signal strength indicator for one of the first and second wireless links may be a received signal strength indicator, and the determined signal strength indicator for the other one of the first and second wireless links may be a transmission power.

A device having a first antenna system for communicating over a first wireless link and a second antenna system for communicating over a second wireless link may be provided. For different transmit power levels of the first and/or second wireless links, an antenna coupling factor between the first antenna system and the second antenna system may be measured for different beamforming configurations of the first antenna system, a received signal strength indicator (RSSI) of the first and/or second wireless link may be measured for different beamforming configurations of the first antenna system, and each beamforming configuration at the different transmit power levels may be stored with the measured antenna coupling factor and the measured RSSI in a memory as a predefined beamforming configuration.

A portion of the predefined beamforming configurations may define different transmission angles for the beam of the first antenna system and different transmit power levels of the first antenna system and may be associated with the measurement of the coupling factor between the first antenna system and the second antenna system and the measurement of the RSSI of the second wireless link.

A portion of the predefined beamforming configurations may define different receiving angles for the beam of the first antenna system and different transmit power levels of the second antenna system and may be associated with the measurement of the antenna coupling factor between the first antenna system and the second antenna system and a measurement of the RSSI of the first wireless link.

A portion of the predefined beamforming configurations may be designated as blackout regions based on the coupling factor between the first antenna system and the second antenna system and the RSSI of the first or second wireless link.

The transmission and receiving angles for the beam of a predefined beamforming configuration that is designated as a blackout region may be a contiguous range of angles defined in 3-dimensional space.

According to an embodiment of the disclosed subject matter, a means for determining a beamforming configuration for the first antenna system based on predefined beamforming configurations where the beamforming configuration does not direct a beam for transmitting through blackout regions for the second antenna system defined in the plurality of predefined beamforming configurations at transmit power levels associated with the blackout regions, a means for configuring the first antenna system in accordance with the selected beamforming configuration, a means for communicating over the first wireless link using the configured first antenna system and over the second wireless link using the second antenna system, a means for determining a signal strength indicator for each of the first and second wireless links, where the determined signal strength indicator for one of the first and second wireless links is a received signal strength indicator, and the determined signal strength indicator for the other one of the first and second wireless links is a transmission power, a means for providing a device having a first antenna system for communicating over a first wireless link and a second antenna system for communicating over a second wireless link, a means for, for different transmit power levels of the first and/or second wireless links, measuring an antenna coupling factor between the first antenna system and the second antenna system for different beamforming configurations of the first antenna system and measuring a received signal strength indicator (RSSI) of the first and/or second wireless link for the different beamforming configurations of the first antenna system and storing each beamforming configuration at each of the plurality of different transmit power levels with the measured antenna coupling factor and the measured RSSI in a memory as a predefined beamforming configuration are included.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 3 shows an example arrangement suitable for preconfigured antenna beamforming according to an implementation of the disclosed subject matter.

DETAILED DESCRIPTION

Figure 1:
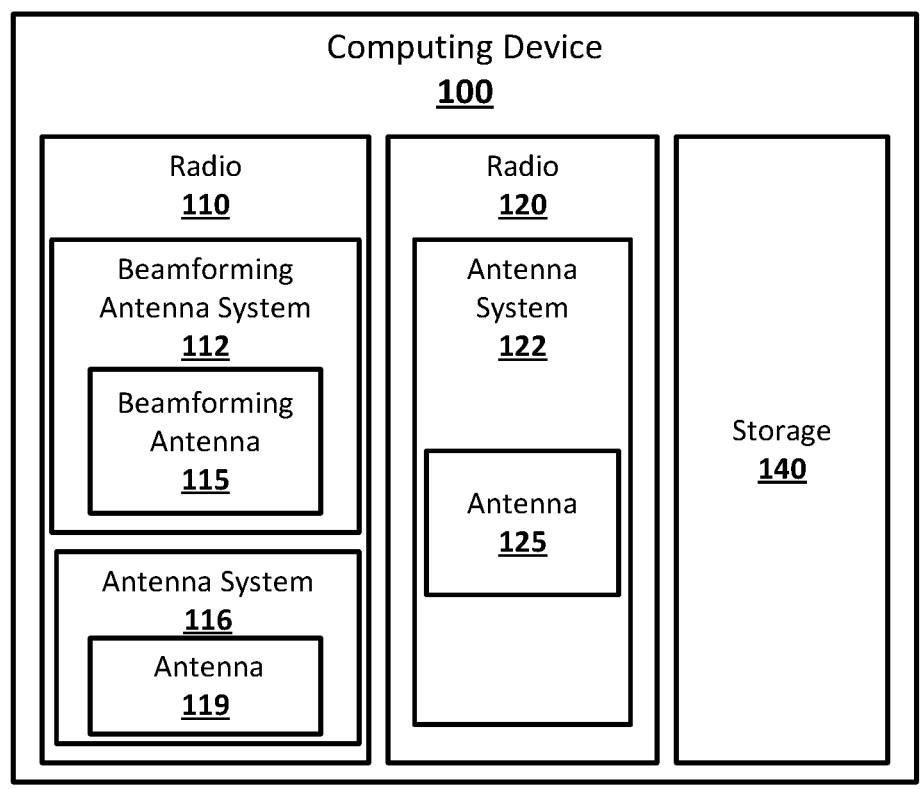
FIG. 1 shows an example system suitable for preconfigured antenna beamforming according to an implementation of the disclosed subject matter.

According to embodiments disclosed herein, preconfigured antenna beamforming may allow for the determination and use of beamforming configurations that may reduce antenna coupling between antennas for different radios in the same computing device. A computing device may have multiple antenna systems for communication using different wireless links corresponding to different radio access networks. The antenna systems may include a beamforming antenna system with a beamforming antenna. The beamforming antenna system and one of the other antenna systems may each be operated at a number of different power levels, and the beamforming antenna may be swept through a range of angles, and various measurements may be taken. The measurements may include the coupling factor between the beamforming antenna system and the other antenna system, as measured in dB, and the received signal strength indicator (RSSI) of the beamforming antenna system and the other antenna system, as measured in dBm. Blackout regions for the beamforming antenna system may be determined based on the measurements. The blackout regions may be stored as predetermined beamforming configurations that may be used by the beamforming antenna system when the computing device is in use to avoid coupling between the beamforming antenna system and the other antenna system and avoid desense of the radios using the antenna systems. By applying predetermined beamforming configurations it may be possible to avoid such desense of the radios while at the same time maintaining low latency and high data throughput over the wireless links without the need for substantially more computing power at the electronic device. This may be particularly effective when the electronic device is moving at high speed.

A computing device may have multiple antenna systems. The computing device may be, for example, a smartphone, tablet, laptop, smartwatch or other mobile computing device, or may be any other computing device that may include multiple radios and antenna systems for communication over different wireless links. For example, a smartphone may include a 5G NR radio, a 4G LTE radio, and a Wi-Fi radio. The 5G radio may include an antenna system for use in two frequency ranges, frequency range 1 (FR1) which may include sub-6 GHz frequency bands, and frequency range 2 (FR2), which may include bands above 24 GHz including frequencies in the millimeter wave band. The 5G radio may include a beamforming antenna system for FR2, such as, for example, a phased array antenna. The antenna systems for FR1, 4G LTE, and Wi-Fi may be non-beamforming antenna systems. There may be a potential for coupling between the antenna systems for 5G NR FR2 and 4G LTE, 5G NR FR1 and 5G NR FR2, and 5G NR FR1/FR2 and Wi-Fi.

The beamforming antenna system and one of the other antenna systems in a computing device may each be operated at a number of different power levels and the beamforming antenna may be swept through a range of angles while various measurements are taken. The beamforming antenna system may sweep its beam through any suitable range of angles defined relative to any suitable point. For example, the beam may be swept through all of the angles in a sphere around the beamforming antenna, 360 degrees through the x-y plane and the y-z plane with origins at the center of the beamforming antenna, or may be swept through any suitable subset of these angles. The beam may be swept through the range of angles at any suitable granularity. The beam may be swept through the range of angles multiple times at multiple different transmit power levels. For each combination of angle and transmit power level, the RSSI of the other antenna system and its radio, and the coupling factor between the beamforming antenna system and the other antenna system, may both be measured. The measurements may be stored in a table along with the transmit power level and angle of the beam generated by the beamforming antenna system. The sweeping of the beam through the range of angles may be repeated with beamforming antenna system in a receiving mode and the transmit power level of the other antenna system and radio being changed, and the RSSI of the beamforming antenna system and radio being measured. In the receiving mode, the sweeping of the beam may be implemented by changing the weighting given to signals received by different individual antenna elements of a phased array antenna, changing the angle at which the beamforming antenna system is most sensitive to signals. For example, the beam from the 5G NR FR2 antenna system may be swept through a range of angles repeatedly at various transmit power levels, and the RSSI of the 4G LTE antenna system and radio, and coupling between the 5G NR FR2 antenna system and the 4G LTE antenna system, may be measured and stored in table. The sweeping of the beam from the 5G NR FR2 antenna system through the range of angles may be repeated, but with the transmit power levels of the 4G LTE antenna system and radio changing and the RSSI of the 5G NR FR2 antenna system radio being measured with the 5G NR FR2 antenna system and radio operating in a receiving mode.

When a computing device has more than one other antenna system in addition to the beamforming antenna system, measurements may be taken and stored in a table for the additional antenna systems in the same manner. This may establish tables that show the correlation between the beamforming antenna system and each of the other antenna systems that are part of the same computing device. For example, if a computing device has both a 4G LTE antenna system and radio and Wi-Fi antenna system and radio in addition to the 5G NR radio with FR1 and FR2 antenna systems, tables may be established with measurements for RSSI at varying beam angles and transmit power levels between 5G NR FR2 and 5G NR FR1, 5G NR FR2 and Wi-Fi, and 5G NR FR2 and 4G LTE. If a computing device also has multiple beamforming antenna systems, measurements may be taken and stored in the table for the other beamforming antenna systems in the same manner.

The tables may include blackout region designations. The blackout regions may be angle ranges that the beamforming antenna system may avoid in order to prevent antenna coupling between the beamforming antenna system and one of the other antenna systems that is part of the mobile computing device. The blackout regions may be determined based on the angle, transmit power level, and RSSI power measurements of the table. For example, angles of the beam at a particular transmit power level for the beamforming antenna system or a non-beamforming antenna system that result in some combination of a low RSSI for either the beamforming antenna system and radio or the non-beamforming antenna system and radio and a high coupling factor may be designated as part of a blackout region. Entries in a table may be consolidated, so that a contiguous range of angles may have a single line in the table as a blackout region if each of the individual angles would be designated a blackout region at the same transmit power level, instead of having a separate line in the table for each angle. This may reduce the size of the table when dealing with high granularity in the angles of the beam. Blackout region designations may be stored in the table alongside the measurements, including the transmit power level, that resulted in the designation and the angle range that is part of the blackout region. The transmit power level associated with a blackout region may be treated as a floor, with the blackout region including any transmit power level at or above the transmit power level associated with the blackout region in the table. For example, a blackout region that is associated with a beam transmit power level of 20 dB may also include beam transmit power levels above 20 dB.

Blackout regions may be designated by giving any suitable weighting to the measurements of the RSSI and antenna coupling factor. For example, RSSI may be weighted more than antenna coupling factor a low antenna coupling factor and low RSSI may result in the designation of a blackout region, while a high antenna coupling factor and high RSSI may not result in the designation of a blackout region. The determination of the when a particular combination of RSSI and coupling factor result in the designation of a blackout region may depend, for example, on the nature of the radio and antenna system that the coupling may interfere with and the operational needs of the computing device of which that radio and antenna system are a component. For example, some computing devices may be able to tolerate more antenna coupling on their 4G LTE antenna system than others, as they may not need as strong or as a reliable a connection from their 4G LTE radio.

The tables, with blackout region designations, may be stored on the computing device and used as predefined beamforming configurations for the beamforming antenna system and radio of the computing device. The tables may, for example, be incorporated as part of the beamforming codebook for the beamforming antenna system and radio. While the computing device is in operation, the beamforming antenna system and radio may use the beamforming codebook when setting the transmit power level and angles for the beam. The beamforming codebook may set the transmit power levels and angles according to any suitable beamforming criteria and algorithms, using any suitable data about the current status of the computing device and the device that a wireless link is being established with. The incorporation of the tables into the beamforming codebook may result in the beamforming antenna system not directing beams through blackout regions designated in the tables at or above beam transmit power levels associated with those blackout regions. The beamforming codebook may also result in the beamforming antenna system not directing beams through blackout regions designated in the tables when the beamforming antenna system is in a receiving mode and another antenna system of the computing device is at or above a transmit power level associated with those blackout regions for that antenna system. The beam from the beamforming antenna system may be formed to avoid blackout regions in tables for all other antenna systems of the computing device. For example, if a computing device has both a 4G LTE antenna system and radio and a Wi-Fi antenna system and radio, the 5G NR FR2 beamforming antenna system may avoid beam angles and transmit power levels that are designated as blackout regions in the tables for both the 4G LTE antenna system and the Wi-Fi antenna system.

The tables of the predetermined beamforming configurations may also be used by the beamforming antenna system when there is no beamforming codebook. For example, the beamforming antenna system, when directing and setting the transmit power level for the beam, may reference the tables to ensure that the beam is not at an angle and at or above a transmit power level that has been designated as a blackout region. The beamforming antenna system may also check the tables to ensure that the beam is not at an angle that is part of a blackout region based on the transmit power level of another antenna system of the computing device when the beamforming antenna system is in a receiving mode. The beamforming antenna system may make adjustments to the direction and transmit power level of a beam as necessary before generating the beam to ensure that the beam does not impinge on blackout regions for any of the other antenna systems on the same computing device as the beamforming antenna system. The beamforming antenna system may also request, for example, that another antenna system reduce its transmit power level, when the beamforming antenna system is in a receiving mode.

In some implementations, the beamforming antenna system may be capable of generating multiple beams simultaneously, each with a different angle and transmit power level. The use of the predefined beamforming configurations may prevent any of the multiple beams from being directed at angle that is part of a blackout region at or above a transmit power level associated with that blackout region in one of the tables, or at an angle that is part of a blackout region based on the transmit power level of another antenna system of the computing device.

In some implementations, a computing device may include more than one beamforming antenna system. Predetermined beamforming configurations, for example, in the form of tables, may be produced for all of the beamforming antenna system on a computing device. For example, a 5G NR FR1 antenna system may also be a beamforming antenna system on the same computing device as a beamforming antenna system for 5G NR FR2. Tables may be generated and used between the 5G NR FR1 beamforming antenna system and non-beamforming antenna systems of the computing device, such as the 4G LTE and Wi-Fi antenna systems, in the same manner that tables are generated between the 5G NR FR2 beamforming antenna system and non-beamforming antenna systems of the computing device.

The predetermined beamforming configurations may be determined at any suitable time. For example, the predetermined beamforming configurations may be determined when a computing device is being designed and tested, after radios and antenna systems have been positioned within the computing device.

When the first antenna system is configured in accordance with a beamforming configuration that does not direct a beam through blackout regions for the second antenna system, the first antenna system is configured to not direct, e.g. emit, a beam through the blackout regions.

In some implementations, when the first antenna system is configured in accordance with a beamforming configuration that does not direct a beam through blackout regions for the second antenna system, the first antenna system emits radio waves predominantly in one or more regions which are different from the blackout regions. For example, when configured as such, the first antenna system may be adapted to emit radio waves that destructively interfere in the blackout regions.

The blackout regions may comprise contiguous regions and/or regions that are spaced apart from one another.

FIG. 1 shows an example system suitable for preconfigured antenna beamforming according to an implementation of the disclosed subject matter. A computing device 100 may include a radio 110, a radio 120, and a storage 140. The computing device 100 may be any suitable device, such as, for example, a computer 20 as described in FIG. 10, that may include the radio 110, the radio 120, and the storage 140. The computing device 100 may be, for example, a single computing device, or may include multiple connected computing devices, and may be, for example, a smartphone, tablet, laptop, smart watch, or other mobile computing device, or may be a computing device that may be intended to be non-mobile, such a desktop computer or smart television. The radio 110 may be, for example, a wireless radio that employs a beamforming antenna system 112 to establish wireless links. For example, the radio 110 may be a 5G NR radio. The radio 110 may also include an antenna system 116, which may be non-beamforming. The radio 120 may be, for example, a wireless radio that employs an antenna system 122 that may be non-beamforming to establish wireless links. For example, the radio 120 may be a 4G LTE radio or a Wi-Fi radio. The storage 140 may be any suitable combination of hardware and software for implementing any combination of volatile and non-volatile storage, and may include storage that may be accessed by the radio 110 and the radio 120.

The radio 110 may include the beamforming antenna system 112, which may include a beamforming antenna 115. The beamforming antenna 115 may be any suitable antenna which may allow for beamforming. For example, the beamforming antenna 115 may be phased array antenna including any number of individual antenna elements. The beamforming antenna system 112, as part of the radio 110, may control the beamforming antenna 115, generating beams to establish wireless links with other devices that include the appropriate radios and antennas. Beamforming may be used in both transmitting and receiving modes of the beamforming antenna system 112. For example, in transmitting mode, beamforming may be used to form a transmitted beam of energy by controlling transmitted energy from individual antenna elements of a phased antenna array. In receiving mode, beamforming may be used to control the weighting given to the signal received by different antenna elements of the phased antenna array. The beam in the receiving mode may be the direction in which the phased array antenna is most sensitive to receiving signals based on the weightings. The beamforming antenna system 112 may operate the beamforming antenna 115 at any suitable frequency range. For example, the radio 110 may be a 5G NR radio, and the beamforming antenna system 112 may be used for 5G NR FR2, which may operate from 24 GHz into millimeter wave frequencies. In some implementations, the radio 110 may include an antenna system 116, with a non-beamforming antenna 119, in addition to the beamforming antenna system 112. The antenna system 116 may be part of the radio 110 that operates the antenna 119 at a frequency range different from that of the beamforming antenna system 112. For example, the antenna system 116 may be used by a 5G NR radio for 5G NR FR1, which may include sub-6 GHz frequency bands. The radio 110 may use the beamforming antenna system 112 and the antenna system 116 concurrently, as each antenna system may communicate over separate wireless links The radio 120 may include the antenna system 122, which may include the antenna 125. The antenna 125 may be non-beamforming antenna, and may be operated by the antenna system 122 at any suitable frequencies. For example, the radio 120 may be a 4G LTE radio, and the antenna system 122 may operate at 700 MHz, 1700-2100 MHz, 2500-2700 MHz, or any other 4G LTE frequency band. The radio 120 may be, for example, a Wi-Fi radio, and the antenna system may operate at 900 MHz 2.4 GHz, 3.6 GHz, 4.9 GHz, 5 GHz, 5.9 GHz and 60 GHz, or any other Wi-Fi frequency band. The radio 110 and the radio 120, and their antenna systems, may operate concurrently in the computing device 100, communicating over separate wireless links.

The storage 140 may be any suitable storage hardware connected to the computing device 100. For example, the storage 140 may be a component of the computing device, and may include both volatile and non-volatile storage components. The storage 140 may store data that may be used by the radio 110 for beamforming with the beamforming antenna system 112. For example, the storage 140 may store a beamforming codebook which may incorporate predetermined beamforming configurations, or may store the predetermined beamforming configurations separately if, for example, the radio 110 does not use a beamforming codebook.

Figure 2A:
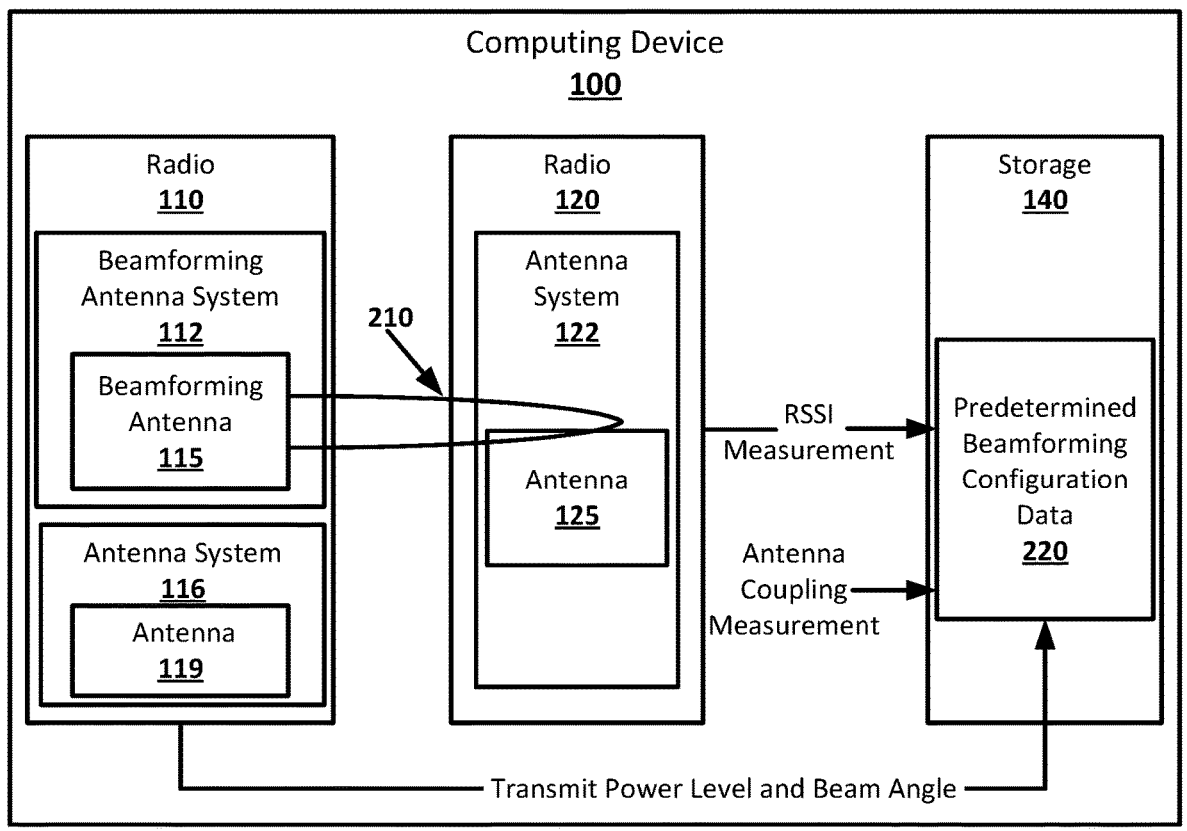
FIG. 2A shows an example arrangement suitable for preconfigured antenna beamforming according to an implementation of the disclosed subject matter.

FIG. 2A shows an example arrangement suitable for preconfigured antenna beamforming according to an implementation of the disclosed subject matter. Predetermined beamforming configuration data 220 may be generated for the beamforming antenna system 112 of the radio 110 and the antenna system 122 of the radio 120. The beamforming antenna 115 may operate in transmitting mode and may be controlled to generate a beam 210. The beam 210 may be generated over a range of angles and a range of transmit power levels. For example, the beam 210 may be started at an initial, low, power level, and swept through all possible angles in 3-dimensional space relative to the beamforming antenna 115 at which the beamforming antenna system 112 may be capable of generating the beam 210, or through some specified subset of those angles. The beam 210 may be swept through angles at any suitable granularity. At each separate angle, the transmit power level and angle of the beam 210, an RSSI measurement from the antenna system 122, and an antenna coupling measurement of antenna coupling between the beamforming antenna 115 and the antenna 125 may be stored as predetermined beamforming configuration data 220 in the storage 140. After completing a sweep through all of the angles at the initial transmit power level, the transmit power level may be increased, and the sweep of the beam 210 through the angles may be repeated. This may be repeated for any suitable number of transmit power levels, with the increases in the transmit power level being at any suitable granularity. This may also be repeated between every beamforming and non-beamforming antenna of the computing device 100, including, for example, between the beamforming antenna system 112 and the antenna system 116.

Figure 2B:
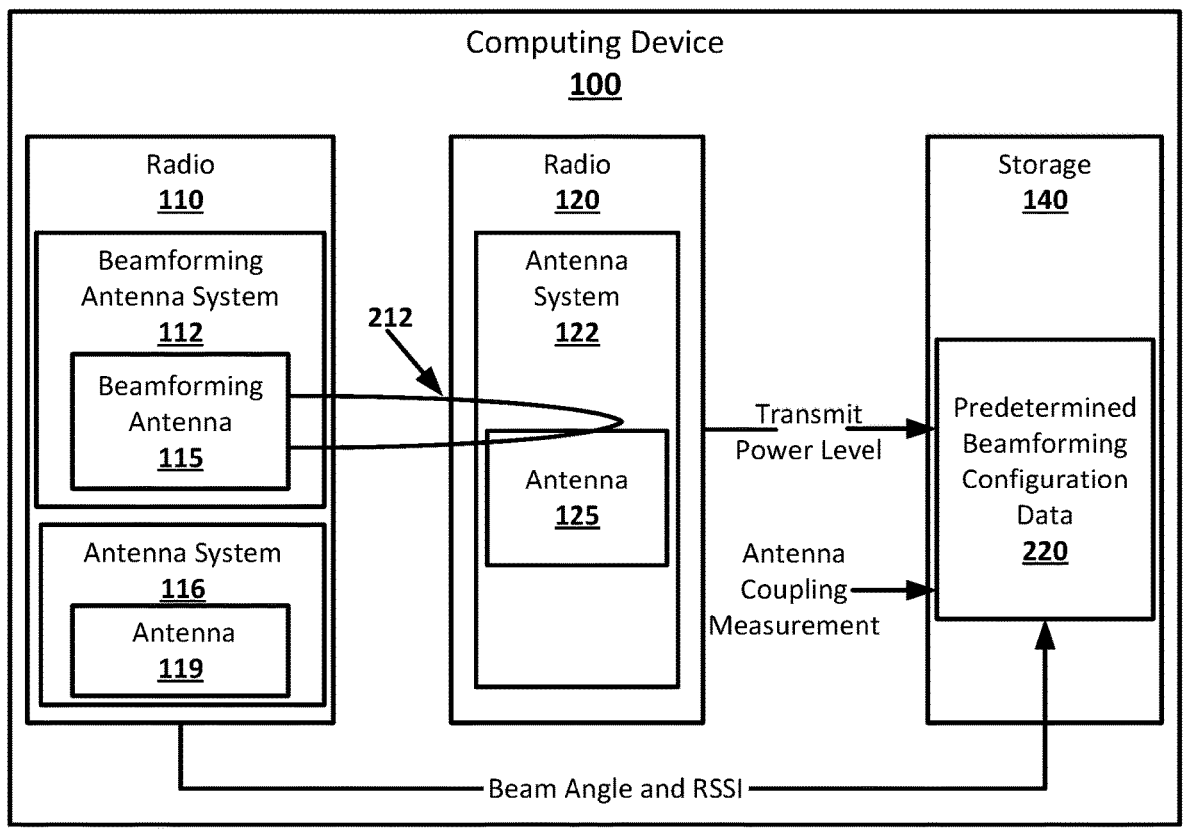
FIG. 2B shows an example arrangement suitable for preconfigured antenna beamforming according to an implementation of the disclosed subject matter.

FIG. 2B shows an example arrangement suitable for preconfigured antenna beamforming according to an implementation of the disclosed subject matter. The beamforming antenna 115 may operate in a receiving mode and be controlled to generate a beam 212, which may the direction in which the beamforming antenna 115 is most sensitive to received signals based on, for example, the weighting of signals received by antenna elements of the beamforming antenna 115. The beam 212 may be generated over a range of angles. The antenna 125 may be operated by the antenna system 122 over a range of transmit power levels while the beam 212 is generated over the range of angles. For example, the beam 212 may be swept through all possible angles in 3-dimensional space relative to the beamforming antenna 115 at which the beamforming antenna system 112 may be capable of generating the beam 212, or through some specified subset of those angles, while the antenna 125 is transmitting at an initial, low, transmit power level. At each separate angle, the angle of the beam 212, an RSSI measurement from the antenna system 112, the transmit power level of the antenna 125, and an antenna coupling measurement of antenna coupling between the beamforming antenna 115 and the antenna 125 may be stored as predetermined beamforming configuration data 220 in the storage 140. After completing a sweep through all of the angles while the antenna 125 is at the initial transmit power level, the transmit power level of the antenna 125 may be increased, and the sweep of the beam 212 through the angles may be repeated. This may be repeated for any suitable number of transmit power levels, with the increases in the transmit power level being at any suitable granularity. This may also be repeated between every beamforming and non-beamforming antenna of the computing device 100, including, for example, between the beamforming antenna system 112 and the antenna system 116.

FIG. 3 shows an example arrangement suitable for preconfigured antenna beamforming according to an implementation of the disclosed subject matter. The predetermined beamforming configuration data 220 may be stored in any suitable format, such as, for example, as tables. For example, the table 310 may store transmit power levels and angles of the beam 210, RSSI measurements from the antenna system 122, and antenna coupling measurements of antenna coupling between the beamforming antenna 115 and the antenna 125 as an antenna coupling factor, for the various angles and transmit power levels of the beam 210. The table 310 may, for example, correlate 5G NR FR2 that is transmitting with the 4G LTE, Wi-Fi, or 5G NR FR1 based on changing the transmit power level for 5G NR FR2 and measuring the RSSI of 4G LTE, Wi-Fi, or 5G NR FR1.

The table 310 may also include blackout region designations. For example, a set of the transmit power level and angle of the beam 210, RSSI measurement from the antenna system 122, and antenna coupling measurement of antenna coupling between the beamforming antenna 115 and the antenna 125 as an antenna coupling factor may be designated as a blackout region based on the RSSI measurement at the antenna 125 and the antenna coupling factor. A low RSSI measurement may, for example, result in designation as a blackout region. Contiguous angles of the beam 210 at the same specific transmit power level, or at transmit power levels above a floor, of the beam 210 that are designated blackout regions may be combined into a single line in the table 310 which may include an indication of the entire angle range that has been designated as a blackout region at the transmit power level floor of the beam 210. Similarly, contiguous angles of the beam 210 at or above a specific transmit power level of the beam 210 that are not designated blackout regions may be combined into a single line in the table 310 which may include an indication of the entire angle range that has been designated as not being a blackout region at or above that specific transmit power level of the beam 210.

The table 320 may store the angles of the beam 212, RSSI measurements from the antenna system 112, transmit power levels of the antenna system 122, and antenna coupling measurements of antenna coupling between the beamforming antenna 115 and the antenna 125 as an antenna coupling factor, for the various angles of the beam 210 and transmit power levels of the antenna system 122. The table 320 may, for example, correlate 5G NR FR2 that is receiving with the 4G LTE, Wi-Fi, or 5G NR FR1 based on changing the transmit power level for 4G LTE, Wi-Fi, or 5G NR FR1 and measuring the RSSI of 5G NR FR2. The table 320 may also include blackout region designations, similar to the table 310.

The predetermined beamforming configuration data 220 may store data correlating any beamforming antenna system of the computing device 100 with any non-beamforming antenna system of the computing device 100. For example, the predetermined beamforming configuration data 220 may store tables for data gathered between the beamforming antenna system 112, which may be for 5G NR FR2, and the antenna system 116, which may be for 5G NR FR1. Each pair of antenna systems may result in two tables, one in which the transmit power level of the beamforming antenna system in a transmitting mode was changed during measurement and the RSSI of the non-beamforming antenna system was measured, and the other in which the transmit power level of the non-beamforming antenna system was changed during measurement and the RSSI of the beamforming antenna system in a receiving mode was measured.

Figure 4A:
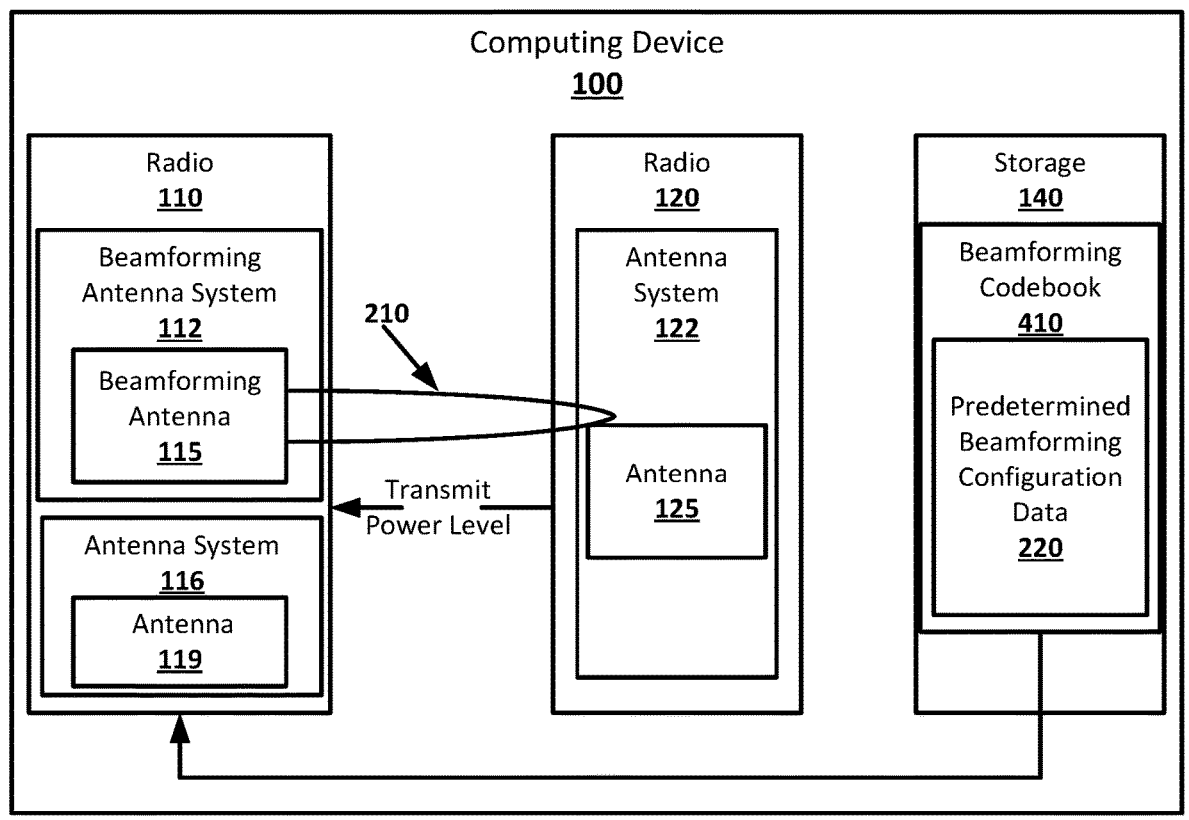
FIG. 4A shows an example arrangement suitable for preconfigured antenna beamforming according to an implementation of the disclosed subject matter.

FIG. 4A shows an example arrangement suitable for preconfigured antenna beamforming according to an implementation of the disclosed subject matter. The predetermined beamforming configuration data 220 may be used by the beamforming antenna system 112 when the computing device 100 is in operation. The predetermined beamforming configuration data 220 may, for example, be incorporated into a beamforming codebook 410 for the radio 110 and beamforming antenna system 112. The beamforming codebook 410 may be stored in the storage 140. The beamforming codebook 410 may be any suitable codebook for beamforming with the beamforming antenna 115.

The beamforming antenna system 112 may generate the beam 210 in accordance with the beamforming codebook 410 when the beamforming antenna system is in a transmitting mode. For example, the beamforming codebook 410 may be used to determine the direction and transmit power level for the beam 210 based on the current status of the computing device 100 and the relative position of the beamforming antenna 115 to an antenna of a device with which a wireless link has been or will be established, and to which data will be sent using the beam 210. The direction and transmit power level for the beam 210, as generated based on the beamforming codebook 410 may be compared to the angle ranges and transmit power levels in the predetermined beamforming configuration data 220 to determine if the beam 210 would impinge on a blackout region. If the beam 210 would be directed through a blackout region at or above the transmit power level associated with that blackout region, the beamforming antenna system 112 may make changes to the beam 210 as necessary to avoid the blackout region. For example, the transmit power level of the beam 210 may be lowered and/or the direction of the beam 210 may be adjusted so that it is not directed through the blackout region. When the beamforming antenna system 112 is in a receiving mode, the beamforming codebook 410 may be used to determine the direction of the beam 212, which may be the direction in which the beamforming antenna 115 may be controlled to be more sensitive to received signals. The direction for the beam 212, as generated based on the beamforming codebook 410, and the transmit power level of the antenna system 122, may be compared to the angle ranges and transmit power levels in the predetermined beamforming configuration data 220 to determine if the beam 212 would impinge on a blackout region. If the beam 212 would be directed through a blackout region with the transmit power level of the antenna system 122 at or above the transmit power level associated with that blackout region, the beamforming antenna system 112 may make changes to the beam 212 as necessary to avoid the blackout region, or the transmit power level of the antenna system 122 may be lowered.

Figure 4B:
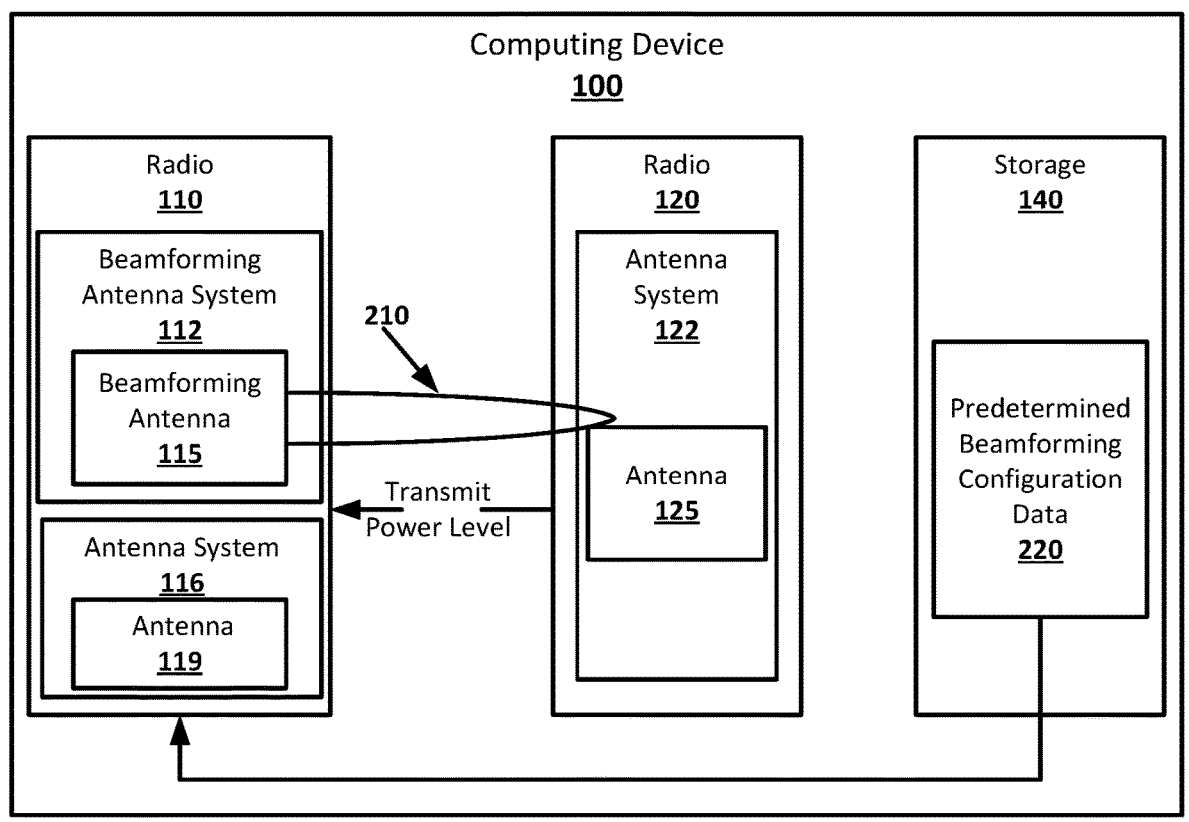
FIG. 4B shows an example arrangement suitable for preconfigured antenna beamforming according to an implementation of the disclosed subject matter.

FIG. 4B shows an example arrangement suitable for preconfigured antenna beamforming according to an implementation of the disclosed subject matter. In some implementations, the beamforming antenna system 112 may not use a beamforming codebook. The beamforming antenna system 112 may generate the beam 210 using any suitable beamforming procedures. The direction and transmit power level for the beam 210, as generated by the beamforming antenna system 112, as well as the transmit power level of the antenna system 122, may still be compared to the angle ranges and transmit power levels in the predetermined beamforming configuration data 220 to determine if the beam 210 would impinge on a blackout region. The beam 210 may still be changed to avoid impinging on blackout regions in the predetermined beamforming configuration data 220 through adjustments to the direction or transmit power level of the beam 210. When the beamforming antenna system 112 is in a receiving mode, the direction for the beam 212, as generated based on any suitable beamforming procedures and the transmit power level of the antenna system 122, may be compared to the angle ranges and transmit power levels in the predetermined beamforming configuration data 220 to determine if the beam 212 would impinge on a blackout region. If the beam 212 would be directed through a blackout region with the transmit power level of the antenna system 122 at or above the transmit power level associated with that blackout region, the beamforming antenna system 112 may make changes to the beam 212 as necessary to avoid the blackout region, or the transmit power level of the antenna system 122 may be lowered.

Figure 5A:
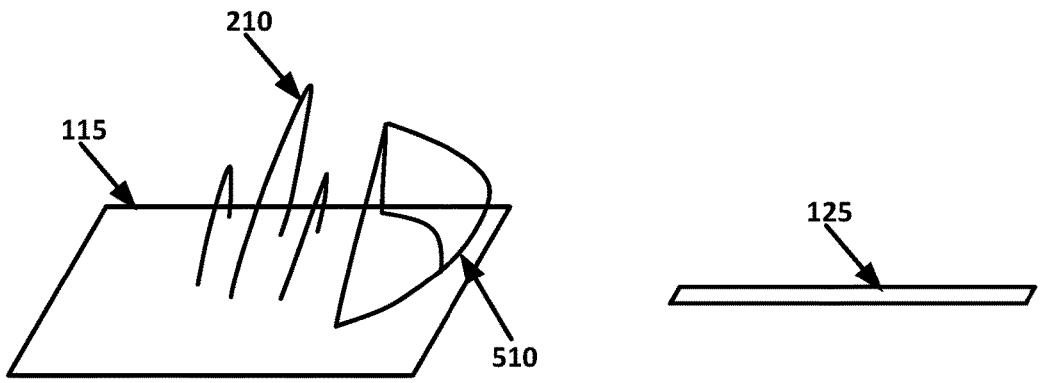
FIG. 5A shows an example arrangement suitable for preconfigured antenna beamforming according to an implementation of the disclosed subject matter.

FIG. 5A shows an example arrangement suitable for preconfigured antenna beamforming according to an implementation of the disclosed subject matter. A blackout region from the predetermined beamforming configuration data may be designated at any suitable range of angles originating from, for example, the center of the beamforming antenna 115. For example, a blackout region 510 may be designated at a range of angles that form a section of a surface of a sphere with its center at the center of the beamforming antenna 115. The section for the blackout region 510 may be located between the center of the beamforming antenna 115 and the antenna 125 in the computing device 100. The beam 210 may be generated to avoid impinging on the blackout region 510 when the beam 210 is at or above the transmit power level associated with the blackout region 510 in the predetermined beamforming configuration data 220. When the beamforming antenna system 112 is in a receiving mode, the blackout region 510 may be associated with a transmit power level of the antenna 125, and the beam 212 may be generated to avoid impinging on the blackout region 510 when the antenna 125 is at that associated transmit power level.

For example, having beams generated to avoid impinging on the blackout region 510 may prevent a beam formed by a beamforming antenna for 5G NR FR2, such as the beamforming antenna 115 of the beamforming antenna system 112, from causing desense on a radio, such as the radio 120, which may be 4G LTE, that may be connected to the antenna 125 of the antenna system 122.

Figure 5B:
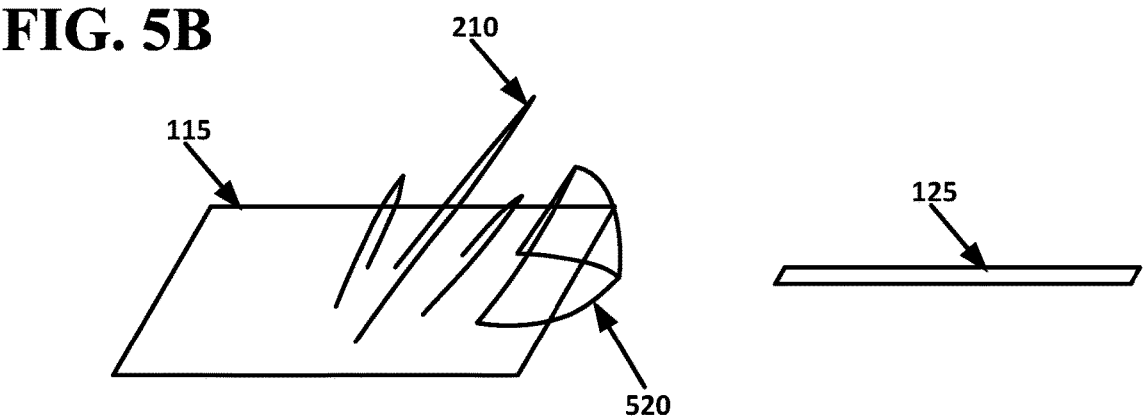
FIG. 5B shows an example arrangement suitable for preconfigured antenna beamforming according to an implementation of the disclosed subject matter.

FIG. 5B shows an example arrangement suitable for preconfigured antenna beamforming according to an implementation of the disclosed subject matter. The predetermined beamforming configuration data 220 may include multiple blackout regions. For example, the predetermined beamforming configuration data 220 may include a blackout region 520 in addition to the blackout region 510. The beam 210 may be generated so as not to impinge on the blackout region 520. The blackout region 510 and the blackout region 520 may be associated with the same transmit power level of the beam 210, or may be associated with different transmit power levels. For example, when the beam 210 is at first transmit power level it may be generated to avoid impinging on the blackout region 520 without regard for the blackout region 510, and when the beam 210 is at a second transmit power level may be generated to avoid impinging on the blackout region 510 and the blackout region 520.

Figure 5C:
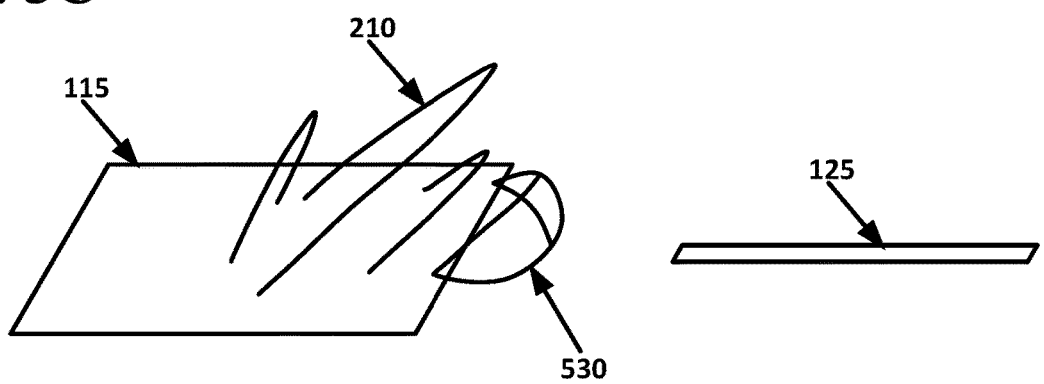
FIG. 5C shows an example arrangement suitable for preconfigured antenna beamforming according to an implementation of the disclosed subject matter.

FIG. 5C shows an example arrangement suitable for preconfigured antenna beamforming according to an implementation of the disclosed subject matter. Blackout regions designated in the predetermined beamforming configuration data 220 may have different sizes. A blackout region 530 may, for example, be smaller than the blackout region 510 and the blackout region 520. The blackout region 530 may cover a smaller range of angles than either the blackout region 510 or the blackout region 520.

Figure 6:
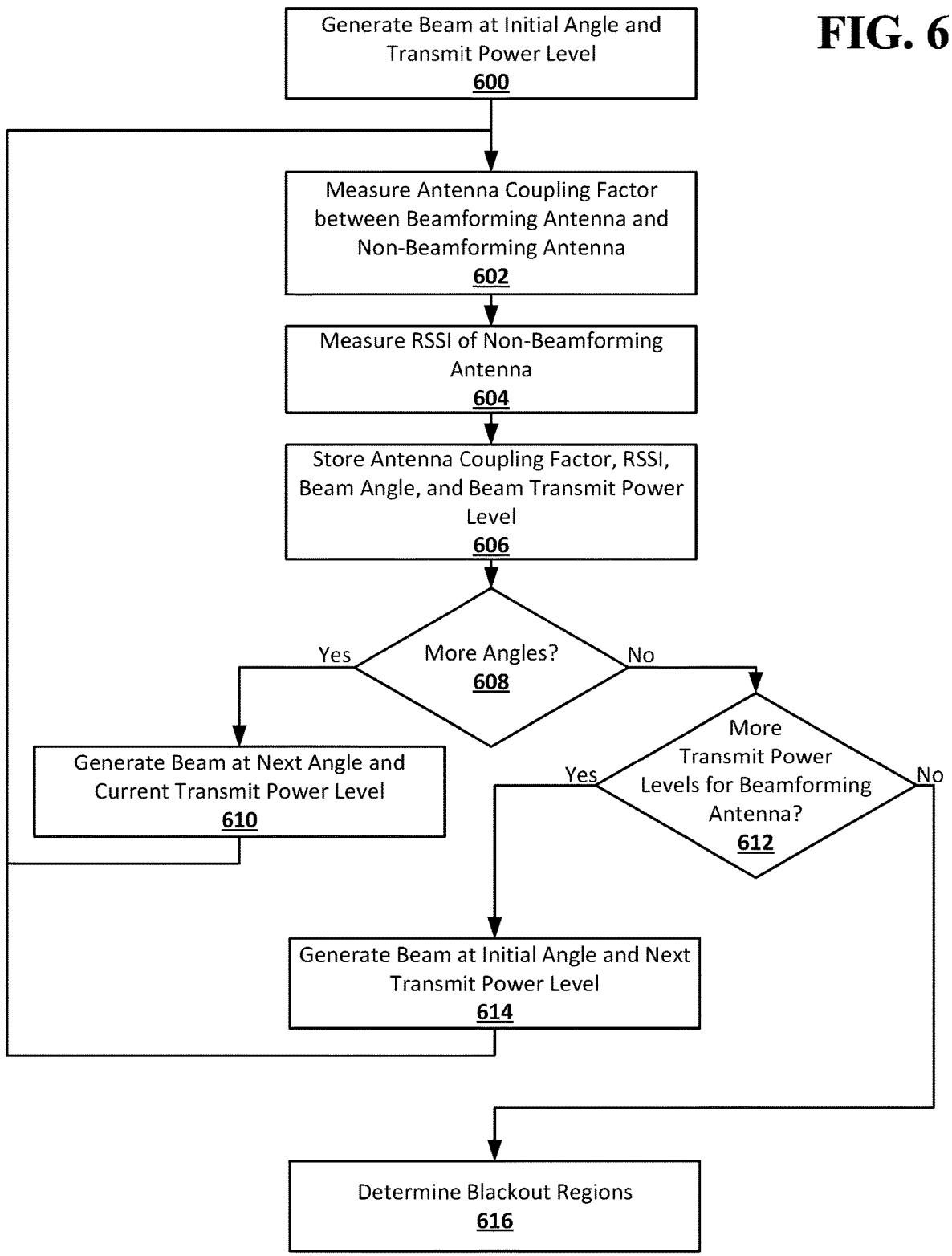
FIG. 6 shows an example of a process suitable for preconfigured antenna beamforming according to an implementation of the disclosed subject matter.

FIG. 6 shows an example of a process suitable for preconfigured antenna beamforming according to an implementation of the disclosed subject matter. At 600, a beam may be generated at an initial angle and transmit power level. For example, the beamforming antenna system 112 of the computing device 100 operating in a transmitting mode may generate the beam 210 at an initial angle relative to, for example, the center of the beamforming antenna 115, and at an initial transmit power level. The initial transmit power level may be, for example, the lowest transmit power level. The beam may be formed from energy transmitted from antenna elements of the beamforming antenna 115, which may be a phased array antenna. The beamforming antenna system 112 may be, for example, an antenna system for 5G NR FR2 for the radio 110, which may be a 5G NR radio.

At 602, an antenna coupling factor between a beamforming antenna and a non-beamforming antenna may be measured. For example, the antenna coupling factor between the beamforming antenna 115 of the beamforming antenna system 112 and the antenna 125 of the antenna system 122, which may be non-beamforming, may be measured while the beamforming antenna system 112 is generating the beam 210. The antenna coupling factor may be measured in dB, and may be measured in any suitable manner, using any suitable component that may be part of the computing device 100 or may be separate from the computing device 100 and may be used, for example, during the design and testing of the computing device 100. The antenna system 122 may be, for example, an antenna system for 4G LTE for the radio 120, which may be a 4G LTE radio, or may be an antenna system for Wi-Fi for the radio 120, which may be a Wi-Fi radio.

At 604, RSSI of the non-beamforming antenna may be measured. For example, the RSSI of the wireless link of the antenna system 122 including the antenna 125 may be measured while the beamforming antenna system 112 is generating the beam 210. The RSSI may be measured in any suitable manner using any suitable component that may be part of the computing device 100 or may be separate from the computing device 100 and may be used, for example, during the design and testing of the computing device 100. For example, the RSSI for the antenna system 122 may be measured by components of the radio 120. The RSSI may be, for example, for the connection between the radio 120, which may be a 4G LTE radio, and a 4G LTE network cell through the antenna system 122.

At 606, the antenna coupling factor, RSSI, beam angle, and beam transmit power level may be stored. For example, the antenna coupling factor measured between the beamforming antenna 115 of the beamforming antenna system 112 and the antenna 125 of the antenna system 122, the RSSI measured for the antenna system 122, the current angle of the beam 210, and the current transmit power level of the beam 210 may be stored as part of the predetermined beamforming configuration data 220 in the storage 140 of the computing device 100. The antenna coupling factor, RSSI, beam angle, and beam transmit power level may be stored, for example, as part of a table that may correlate beam angles and beam transmit power levels for the beamforming antenna system 112 with the RSSI of the antenna system 122. For example, the table may correlate beam angles and beam transmit power for a beam for 5G FR NR2 with RSSI of 4G LTE on the computing device 100.

At 608, if there are more angles for the beam to be swept through, flow may proceed to 610. Otherwise, flow may proceed to 612. For example, the beam 210 may be swept through a range of angles at the same transmit power level. If the beam has been swept through the entire range of angles, flow may proceed to 612, otherwise, flow may proceed to 610. The range of angles may be, for example, all angles at which the beamforming antenna system 112 is capable of generating the beam 210, or some specified subset of those angles.

At 610, the beam may be generated at a next angle and the current transmit power level. For example, the beamforming antenna system 112 of the computing device 100 may generate the beam 210 at a next angle in the range of angles that beam 210 is being swept through and at the current transmit power level. The next angle may be any suitable distance from the previous angle, for example, based on the granularity of the beamforming capabilities of the beamforming antenna system 112. Flow may then proceed back to 602, where measurements may be taken with the beam 210 at the next angle and the same transmit power level that the previous measurements were taken at when the beam 210 was the previous angle.

At 612, if there are more transmit power levels for the beamforming antenna, flow may proceed to 614, otherwise flow may proceed to 616. For example, the beam 210 may be swept through the range of angles once for each of a range of transmit power levels. After being swept through the entire range of angles at a particular transmit power level, the beam 210 may be swept through the range of angles again at a different transmit power levels, until the beam 210 has been swept through the entire range of angles at each transmit power level in the range of transmit power levels.

At 614, the beam may be generated at the initial angle and the next transmit power level. For example, the beamforming antenna system 112 of the computing device 100 may generate the beam 210 at the initial angle in the range of angles that beam 210 is being swept through and at the next transmit power level in the range of transmit power levels. The next transmit power level may differ from the previous transmit power level by any suitable amount, for example, based on the granularity of the transmit power levels used by the beamforming antenna system 112. Flow may then proceed back to 602, where measurements may be taken with the beam 210 at the initial angle and the next transmit power level.

At 616, blackout regions may be determined. For example, the computing device 100, or another computing device with access to the predetermined beamforming configuration data 220, may determine and designate blackout regions based on the predetermined beamforming configuration data 220. The blackout regions may be, for example, regions though which the beam 210 from the beamforming antenna system 112 should not impinge at specified transmit power levels to avoid desensing the antenna system 122 and radio 120. For example, individual entries in the tables of the predetermined beamforming configuration data 220 may be designated as blackout regions based on any suitable combination of a low RSSI measurement and high antenna coupling factor measurement. Entries that have the same transmit power level, or are all above some floor transmit power level, and contiguous angles for the beam 210 and are designated as blackout regions may be consolidated into a single entry that may designate the entire range of contiguous angles in the consolidated entries as a blackout region at or above the transmit power level common to the entries. For example, if all entries for angles in the x-y plane between −30 degrees and 30 degrees and in the y-z plane between 0 and 20 degrees at or above a transmit power level of 20 dB for the beamforming antenna system 112 are designated as blackout regions, they may be consolidated into a single entry that may designate the angles from −30 to 30 degrees in the x-y plane and 0 to 20 degrees in the y-z plane at or above a 20 dB transmit power level of the beamforming antenna system 112 as a blackout regions. Entries for non-blackout regions may similarly be consolidated in the predetermined beamforming configuration data 220.

Figure 7:
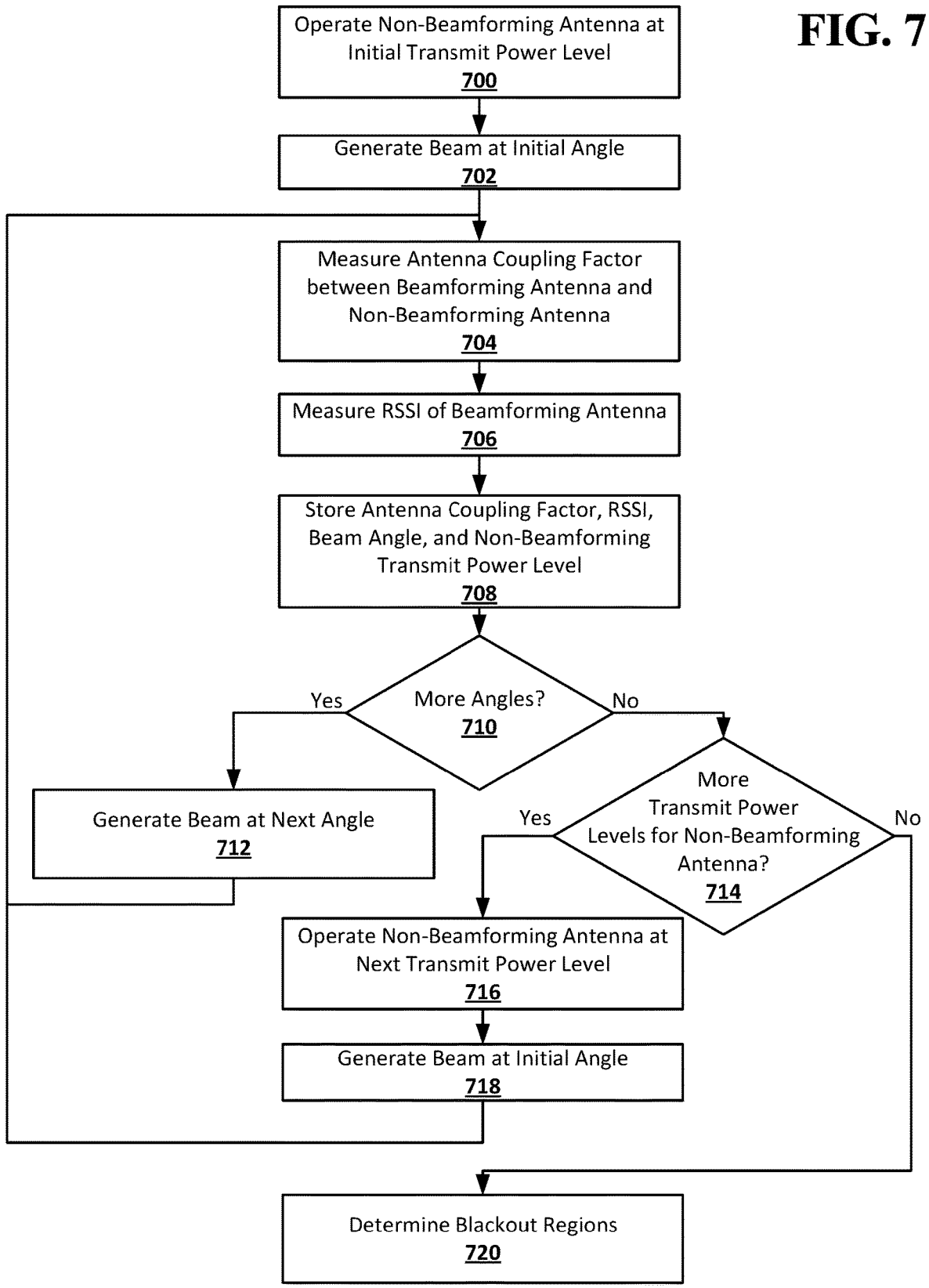
FIG. 7 shows an example of a process suitable for preconfigured antenna beamforming according to an implementation of the disclosed subject matter.

FIG. 7 shows an example of a process suitable for preconfigured antenna beamforming according to an implementation of the disclosed subject matter. At 700, a non-beamforming antenna may be operated at initial transmit power level. For example, the antenna system 122 of the computing device 100 may operate the antenna 125 at an initial transmit power level, sending out any suitable signal from the radio 120. The antenna system 122 may be, for example, an antenna system for 4G LTE or Wi-Fi, and may be non-beamforming.

At 702, a beam may be generated at an initial angle. For example, the beamforming antenna system 112 of the computing device 100 may operate in receiving mode and may generate the beam 212 at an initial angle relative to, for example, the center of the beamforming antenna 115, at any transmit power level. The beam 212 may be formed by changing the weightings given to signals received by antenna elements of the beamforming antenna 115, which may be a phased array antenna. The changed weighting may result in the beamforming antenna system 112 being more sensitive to received signals coming from a particular direction. The beam 212 may represent the direction in which the beamforming antenna system 112 is more sensitive to received signals. The beam 212 may not be formed of energy transmitted by the beamforming antenna 115, as the beamforming antenna system 112 may be in a receiving mode. The beamforming antenna system 112 may be, for example, an antenna system for 5G NR FR2 for the radio 110, which may be a 5G NR radio.

At 704, an antenna coupling factor between a beamforming antenna and a non-beamforming antenna may be measured. For example, the antenna coupling factor between the beamforming antenna 115 of the beamforming antenna system 112 and the antenna 125 of the antenna system 122, which may be non-beamforming, may be measured while the beamforming antenna system 112 is configured to be more sensitive to received signals in the direction represented by the beam 212. The antenna coupling factor may be measured in dB, and may be measured in any suitable manner, using any suitable component that may be part of the computing device 100 or may be separate from the computing device 100 and may be used, for example, during the design and testing of the computing device 100. The antenna system 122 may be, for example, an antenna system for 4G LTE for the radio 120, which may be a 4G LTE radio, or may be an antenna system for Wi-Fi for the radio 120, which may be a Wi-Fi radio.

At 706, RSSI of the beamforming antenna may be measured. For example, the RSSI of the wireless link of the beamforming antenna system 112 including the beamforming antenna 115 may be measured while the beamforming antenna system 112 is configured to listen in a particular direction represented by the beam 212 and the antenna system 122 is operating at a current transmit power level. The RSSI may be measured in any suitable manner using any suitable component that may be part of the computing device 100 or may be separate from the computing device 100 and may be used, for example, during the design and testing of the computing device 100. For example, the RSSI for the beamforming antenna system 112 may be measured by components of the radio 110. The RSSI may be, for example, for the connection between the radio 110, which may be a 5G NR radio, and a 5G network cell using 5G NR FR2 frequencies through the beamforming antenna system 112.

At 708, the antenna coupling factor, RSSI, beam angle, and non-beamforming transmit power level may be stored. For example, the antenna coupling factor measured between the beamforming antenna 115 of the beamforming antenna system 112 and the antenna 125 of the antenna system 122, the RSSI measured for the beamforming antenna system 112, the current angle of the beam 210, and the current transmit power level of the antenna system 122 may be stored as part of the predetermined beamforming configuration data 220 in the storage 140 of the computing device 100. The antenna coupling factor, RSSI, beam angle, and transmit power level may be stored, for example, as part of a table that may correlate beam angles for the beamforming antenna system 112 and non-beamforming transmit power levels for the antenna system 122 with the RSSI of the beamforming antenna system 112. For example, the table may correlate beam angles for a beam for 5G FR NR2 and transmit power levels for 4G LTE with RSSI of 5G NR FR2 on the computing device 100.

At 710, if there are more angles for the beam to be swept through, flow may proceed to 712. Otherwise, flow may proceed to 714. For example, the beam 212 may be swept through a range of angles at the same transmit power level, changing the direction in which the beamforming antenna system 112 is more sensitive to received signals. If the beam has been swept through the entire range of angles, flow may proceed to 712, otherwise, flow may proceed to 710. The range of angles may be, for example, all angles at which the beamforming antenna system 112 is capable of generating the beam 210, or some specified subset of those angles.

At 712, the beam may be generated at a next angle. For example, the beamforming antenna system 112 of the computing device 100 may generate the beam 210 at a next angle in the range of angles that beam 210 is being swept through and at the current transmit power level. The next angle may be any suitable distance from the previous angle, for example, based on the granularity of the beamforming capabilities of the beamforming antenna system 112. Flow may then proceed back to 704, where measurements may be taken with the beam 210 at the next angle and the antenna system 122 at the same transmit power level that the previous measurements were taken at when the beam 210 was the previous angle.

At 714, if there are more transmit power levels for the non-beamforming antenna, flow may proceed to 716, otherwise flow may proceed to 720. For example, the beam 210 may be swept through the range of angles once for each of a range of transmit power levels of the antenna system 122. After being swept through the entire range of angles at a particular transmit power level of the antenna system 122, the beam 210 may be swept through the range of angles again at a different transmit power levels of the antenna system 122, until the beam 210 has been swept through the entire range of angles at each transmit power level of the antenna system 122 in the range of transmit power levels of the antenna system 122.

At 716, the non-beamforming antenna may be operated at a next transmit power level. For example, the antenna system 122 of the computing device 100 may operate the antenna 125 at a next transmit power level, sending out any suitable signal from the radio 120. The next transmit power level may differ from the previous transmit power level by any suitable amount, for example, based on the granularity of the transmit power levels used by the antenna system 122.

At 718, the beam may be generated at the initial angle. For example, the beamforming antenna system 112 of the computing device 100 may remain in the receiving mode and may generate the beam 212 at the initial angle in the range of angles that beam 210 is being swept through and at the same transmit power level. Flow may then proceed back to 704, where measurements may be taken with the beam 210 at the initial angle and the antenna system 122 operating at the next transmit power level.

At 720, blackout regions may be determined. For example, the computing device 100, or another computing device with access to the predetermined beamforming configuration data 220, may determine and designate blackout regions based on the predetermined beamforming configuration data 220. The blackout regions may be, for example, regions though which the beam 212 from the beamforming antenna system 112 should not impinge at specified transmit power levels of the antenna system 122. For example, individual entries in the tables of the predetermined beamforming configuration data 220 may be designated as blackout regions based on any suitable combination of a low RSSI measurement and high antenna coupling factor measurement. Entries that have the same transmit power level, or above a specific floor transmit power level, for the antenna system 122 and contiguous angles for the beam 212 and are designated as blackout regions may be consolidated into a single entry that may designate the entire range of contiguous angles in the consolidated entries as a blackout region at or above the floor transmit power level for the antenna system 122 common to the entries. For example, if all entries for angles in the x-y plane between −30 degrees and 30 degrees and in the y-z plane between 0 and 20 degrees at or above a transmit power level of 20 dB for the antenna system 122 are designated as blackout regions, they may be consolidated into a single entry that may designate the angles from −30 to 30 degrees in the x-y plane and 0 to 20 degrees in the y-z plane at or above a 20 dB transmit power level for the antenna system 122 as a blackout regions. Entries for non-blackout regions may similarly be consolidated in the predetermined beamforming configuration data 220.

Figure 8:
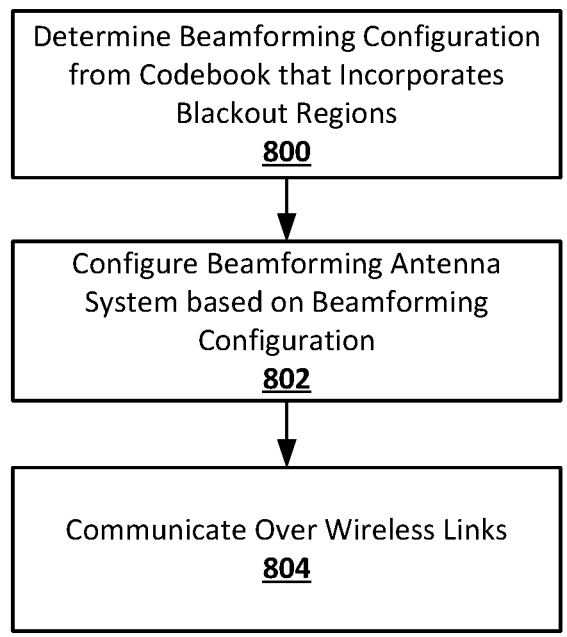
FIG. 8 shows an example of a process suitable for preconfigured antenna beamforming according to an implementation of the disclosed subject matter.

FIG. 8 shows an example of a process suitable for preconfigured antenna beamforming according to an implementation of the disclosed subject matter. At 800, a beamforming configuration may be determined from a codebook that incorporates blackout regions. For example, a beamforming configuration for the antenna system 112 may be determined using the beamforming codebook 410 from the storage 140. The beamforming codebook 410 may incorporate the predetermined beamforming configuration data 220, including the designated blackout regions for non-beamforming antenna systems of the computing device 100, for example, the antenna system 122 and the antenna system 119. The incorporation of the predetermined beamforming configuration data 220 into the beamforming codebook 410 may result in the beamforming codebook 410 not causing the generation of a beam that may impinge on any blackout region when the beam or the non-beamforming antenna system is at the transmit power level associated with that blackout region. The beamforming antenna system 112 may use the beamforming codebook 410 to generate the beam 210 or the beam 212 according to the current status of the computing device 100 and any other device that the beamforming antenna system 112 will be used to communicate with. The beam 210 for transmitting and the beam 212 for receiving may be generated so as not to impinge on any blackout regions in the predetermined beamforming configuration data 220. For example, the beamforming codebook 410 may be used on the computing device 100 to generate a beam for transmitting using 5G NR FR2 that is not directed through blackout regions for 4G LTE, Wi-Fi and/or 5G NR FR1 on the computing device 100 at a transmit power level associated those blackout regions. The beamforming codebook 410 may be used to generate a beam for receiving, for example, directing the sensitivity of the beamforming antenna 115, that is not directed through blackout regions for 4G LTE, Wi-Fi and/or 5G NR FR1 when the 4G LTE, Wi-Fi and/or 5G NR FR1 are operating at transmit power levels associated with those blackout regions.

At 802, a beamforming antenna system may be configured based on the beamforming configuration. For example, the beamforming antenna system 112 may be configured using the beamforming configuration determined from the beamforming codebook 410. The beamforming antenna system 112 may, for example, use the beamforming configuration to operate the beamforming antenna 115 to generate the beam 210 or the beam 212. The beam 210 may not be directed through any of the blackout regions designated in the predetermined beamforming configuration data 220 at the transmit power levels associated with those blackout regions. The beam 212 may not be directed through any of the blackout regions designated in the predetermined beamforming configuration data 220 when a non-beamforming antenna system is operating at a transmit power level associated with those blackout regions.

At 804, wireless links may be used for communication. For example, the beams 210 and 212 may be used to establish a wireless link between the radio 110 and the radio of another device, such as, for example, a network cell for a cellular communications network. The wireless link established by the beams 210 and 212 may be used to allow communication between the computing device 100 and the other device through the radio 110, for example, transmitting and receiving data over the wireless link. A wireless link may also be established by, for example, the antenna system 122 and antenna 125 between the radio 120 and the radio of another device, such as, for example, another network cell or a Wi-Fi router. The wireless link established through the antenna system 122 may be used to allow communication between the computing device 100 and the other device through the radio 120. For example, the wireless link established by the beam 210 and the beam 212 may be a 5G NR FR2 wireless link with a 5G cell, and the wireless link established by the antenna system 122 may be a 4G LTE or Wi-Fi link with a 4G cell or a Wi-Fi router. The antenna system 116 may establish a wireless link, such as, for example, a 5G NR FR1 link with a 5G cell. The computing device 100 may use the established wireless links to send and receive data.

Figure 9:
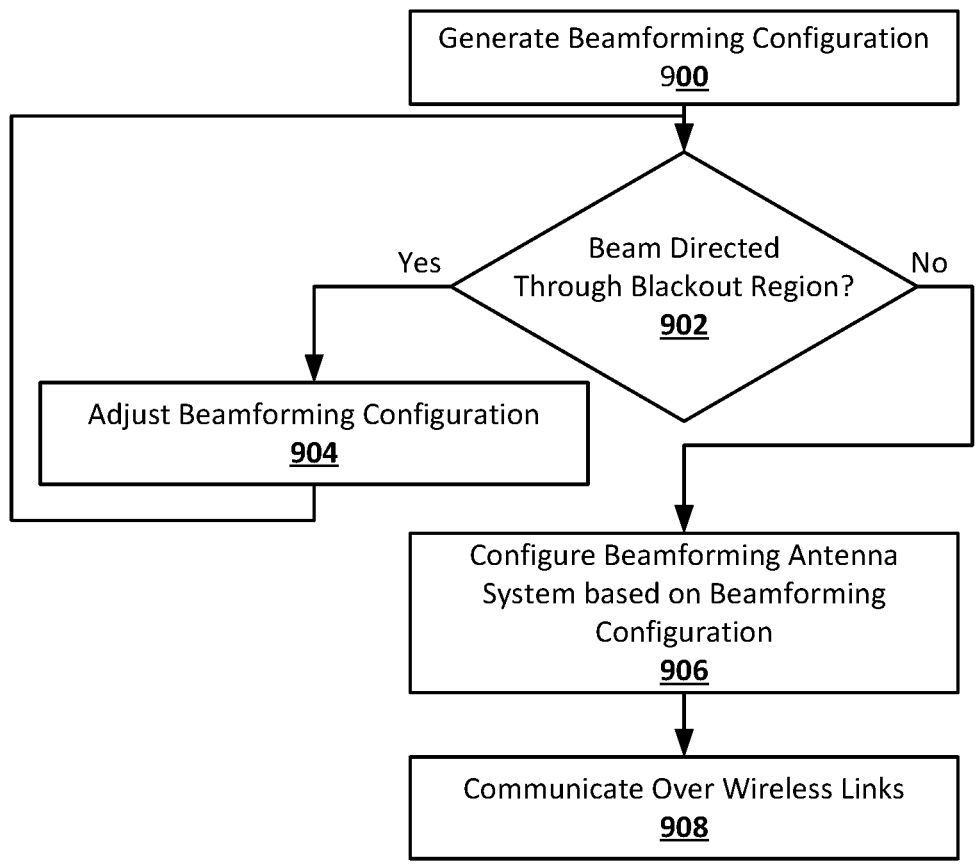
FIG. 9 shows an example of a process suitable for preconfigured antenna beamforming according to an implementation of the disclosed subject matter.

FIG. 9 shows an example of a process suitable for preconfigured antenna beamforming according to an implementation of the disclosed subject matter. At 900, a beamforming configuration may be generated. The beamforming configuration may be generated by, for example, the beamforming antenna system 112 based on the current status of the computing device 100 and any other device that the beamforming antenna system 112 will be used to communicate with. The beamforming configuration may be for generating a beam, for example, for 5G NR FR2.

At 902, if the beam that would be generated by the beamforming configuration would be directed through a blackout region, flow may proceed to 904, otherwise flow may proceed to 906. For example, the beam that would be generated using the beamforming configuration may be compared to the blackout regions designated in the predetermined beamforming configuration data 220 to determine if the beam is directed through any blackout regions at the transmit power level for the beam associated with the blackout regions. If the beam represents a direction from which signals will be receive, the beam may be compared to the blackout regions to determine if the beam is directed through any blackout regions with a non-beamforming antenna system operating a transmit power level associated with the blackout regions. This may be done by, for example, comparing the angle that the beam would be generated at with the angle ranges of the blackout regions designated in the predetermined beamforming configuration data 220. The comparison may be performed by, for example, the beamforming antenna system 112, or any other suitable processing component of the computing device 100. For example, the beamforming configuration may result in the generation of a beam for 5G NR FR2 that may be directed into a blackout region for 4G LTE or Wi-Fi antenna system at or above a transmit power level associated with that blackout region.

At 904, the beamforming configuration may be adjusted. For example, the beamforming configuration may have been determined to generate a beam that would be directed through a blackout region, either at a beam transmit power level or with a non-beamforming antenna system operating at or above a transmit power level that is associated with that blackout region, depending on whether the beam is for transmitting or receiving. The beam may, for example, be directed at a blackout region for the antenna system 122. The beamforming configuration may be adjusted by the beamforming antenna system 112, for example, with the transmit power level of the beam decreased, or the angle of the beam altered, to avoid being directed through the blackout region at the transmit power level associated with the blackout region. For example, the beamforming configuration may be adjusted to generate a beam that may be directed just past an edge of the blackout region for the antenna system 122 at the same transmit power level, or a beam directed at the same angle through the blackout region but at a transmit power level lower than the transmit power level associated with the blackout region. Flow may then proceed back to 902, where the new beamforming configuration may be checked to ensure that the adjustments do not result in the generation of a beam directed through a different blackout region either at a beam transmit power level or with a non-beamforming antenna system operating at or above a transmit power level that is associated with that blackout region.

At 906, a beamforming antenna system may be configured based on the beamforming configuration. For example, the beamforming antenna system 112 may be configured using the beamforming configuration generated and adjusted as necessary by the beamforming antenna system 112. The beamforming antenna system 112 may, for example, use the beamforming configuration to operate the beamforming antenna 115 to generate the beam 210 or the beam 212. The beam 210 may not be directed through any of the blackout regions designated in the predetermined beamforming configuration data 220 at the transmit power levels associated with those blackout regions. The beam 212 may not be directed through any of the backout regions designated in the predetermined configuration data 220 when a non-beamforming antenna system is operating at a transmit power level associated with those blackout regions.

At 908, wireless links may be used for communication. For example, the beams 210 and 212 may be used to establish a wireless link between the radio 110 and the radio of another device, such as, for example, a network cell for a cellular communications network. The wireless link established by the beams 210 and 212 may be used to allow communication between the computing device 100 and the other device through the radio 110, for example, transmitting and receiving data over the wireless link. A wireless link may also be established by, for example, the antenna system 122 and antenna 125 between the radio 120 and the radio of another device, such as, for example, another network cell or a Wi-Fi router. The wireless link established through the antenna system 122 may be used to allow communication between the computing device 100 and the other device through the radio 120. For example, the wireless link established by the beam 210 and the beam 212 may be a 5G NR FR2 wireless link with a 5G cell, and the wireless link established by the antenna system 122 may be a 4G LTE or Wi-Fi link with a 4G cell or a Wi-Fi router. The antenna system 116 may establish a wireless link, such as, for example, a 5G NR FR1 link with a 5G cell. The computing device 100 may use the established wireless links to send and receive data.

Beamformed wireless communication of a device including a first antenna system for communicating over a first wireless link and a second antenna system for communicating over a second wireless link may be configured. A beamforming configuration may be determined for the first antenna system based on predefined beamforming configurations where the beamforming configuration does not direct a beam for transmitting through blackout regions for the second antenna system defined in the predefined beamforming configurations at transmit power levels associated with the blackout regions. The first antenna system may be configured in accordance with the selected beamforming configuration. The first wireless link may be communicated over using the configured first antenna system and second wireless link may be communicated over using the second antenna system.

The beamforming configuration may not direct a beam for receiving through blackout regions for the second antenna system defined in the predefined beamforming configurations and associated with transmit power levels of the second antenna system when the second antenna system is operating at the associated transmit power levels.

The predefined beamforming configurations may define different transmission and receiving angles for the beam of the first antenna system.

The first antenna system may include an antenna array.

The first wireless link and the second wireless link may correspond to different radio access networks.

The first wireless link may operate in a frequency range above 24 GHz, and the second wireless link may operate in a frequency range below 6 GHz.

A signal strength indicator may be determined for each of the first and second wireless links. The determined signal strength indicator for one of the first and second wireless links may be a received signal strength indicator, and the determined signal strength indicator for the other one of the first and second wireless links may be a transmission power.

A device may include a first antenna system for communicating over a first wireless link and a second antenna system for communicating over a second wireless link. The device may determine a beamforming configuration for the first antenna system based on predefined beamforming configurations where the beamforming configuration may not direct a beam for transmitting through blackout regions defined in the predefined beamforming configuration at transmit power levels associated with the blackout regions. The device may configure the first antenna system in accordance with the selected beamforming configuration. The device may communicate over the first wireless link using the configured first antenna system and over the second wireless link using the second antenna system.

The beamforming configuration may not direct a beam for receiving through blackout regions defined in the plurality of predefined beamforming configurations and associated with transmit power levels of the second antenna system when the second antenna system is operating at the associated transmit power levels.

The predefined beamforming configurations may define different transmission and receiving angles for the beam of the first antenna system.

The first antenna system may include an antenna array.

The first wireless link and the second wireless link may correspond to different radio access networks.

The device according to any of claims 9 to 13, wherein the first wireless link operates in a frequency range above 24 GHz, and the second wireless link operates in a frequency range below 6 GHz.

A signal strength indicator may be determined for each of the first and second wireless links. The determined signal strength indicator for one of the first and second wireless links may be a received signal strength indicator, and the determined signal strength indicator for the other one of the first and second wireless links may be a transmission power.

A non-transitory computer-readable medium may include computer-executable instructions that, when executed by one or more processors of a device including a first antenna system for communicating over a first wireless link and a second antenna system for communicating over a second wireless link, perform any of the preceding steps.

A device having a first antenna system for communicating over a first wireless link and a second antenna system for communicating over a second wireless link may be provided. For different transmit power levels of the first and/or second wireless links, an antenna coupling factor between the first antenna system and the second antenna system may be measured for different beamforming configurations of the first antenna system, a received signal strength indicator (RSSI) of the first and/or second wireless link may be measured for different beamforming configurations of the first antenna system, and each beamforming configuration at the different transmit power levels may be stored with the measured antenna coupling factor and the measured RSSI in a memory as a predefined beamforming configuration.

A portion of the predefined beamforming configurations may define different transmission angles for the beam of the first antenna system and different transmit power levels of the first antenna system and may be associated with the measurement of the coupling factor between the first antenna system and the second antenna system and the measurement of the RSSI of the second wireless link.

A portion of the predefined beamforming configurations may define different receiving angles for the beam of the first antenna system and different transmit power levels of the second antenna system and may be associated with the measurement of the antenna coupling factor between the first antenna system and the second antenna system and a measurement of the RSSI of the first wireless link.

A portion of the predefined beamforming configurations may be designated as blackout regions based on the coupling factor between the first antenna system and the second antenna system and the RSSI of the first or second wireless link.

The transmission and receiving angles for the beam of a predefined beamforming configuration that is designated as a blackout region may be a contiguous range of angles defined in 3-dimensional space.

A means for determining a beamforming configuration for the first antenna system based on predefined beamforming configurations where the beamforming configuration does not direct a beam for transmitting through blackout regions for the second antenna system defined in the plurality of predefined beamforming configurations at transmit power levels associated with the blackout regions, a means for configuring the first antenna system in accordance with the selected beamforming configuration, a means for communicating over the first wireless link using the configured first antenna system and over the second wireless link using the second antenna system, a means for determining a signal strength indicator for each of the first and second wireless links, where the determined signal strength indicator for one of the first and second wireless links is a received signal strength indicator, and the determined signal strength indicator for the other one of the first and second wireless links is a transmission power, a means for providing a device having a first antenna system for communicating over a first wireless link and a second antenna system for communicating over a second wireless link, a means for, for different transmit power levels of the first and/or second wireless links, measuring an antenna coupling factor between the first antenna system and the second antenna system for different beamforming configurations of the first antenna system and measuring a received signal strength indicator (RSSI) of the first and/or second wireless link for the different beamforming configurations of the first antenna system and storing each beamforming configuration at each of the plurality of different transmit power levels with the measured antenna coupling factor and the measured RSSI in a memory as a predefined beamforming configuration are included.

Figure 10:
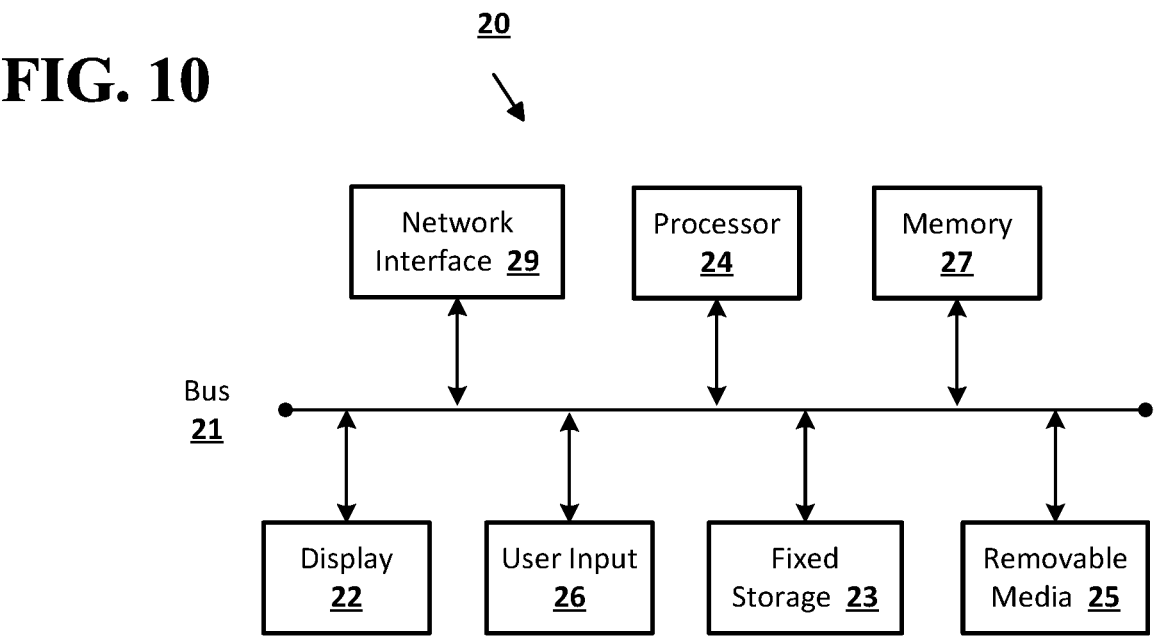
FIG. 10 shows a computer according to an embodiment of the disclosed subject matter.

Implementations of the presently disclosed subject matter may be implemented in and used with a variety of component and network architectures. FIG. 10 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection, or the like. For example, the network interface 29 may allow the computer to communicate with other computers via one or more local, wide-area, or other networks, as shown in FIG. 11.

Many other devices or components (not shown) may be connected in a similar manner (e.g., document scanners, digital cameras, and so on). Conversely, all of the components shown in FIG. 10 need not be present to practice the present disclosure. The components can be interconnected in different ways from that shown. The operation of a computer such as that shown in FIG. 10 is readily known in the art and is not discussed in detail in this application. Code to implement the present disclosure can be stored in computer-readable storage media such as one or more of the memory 27, fixed storage 23, removable media 25, or on a remote storage location.

Figure 11:
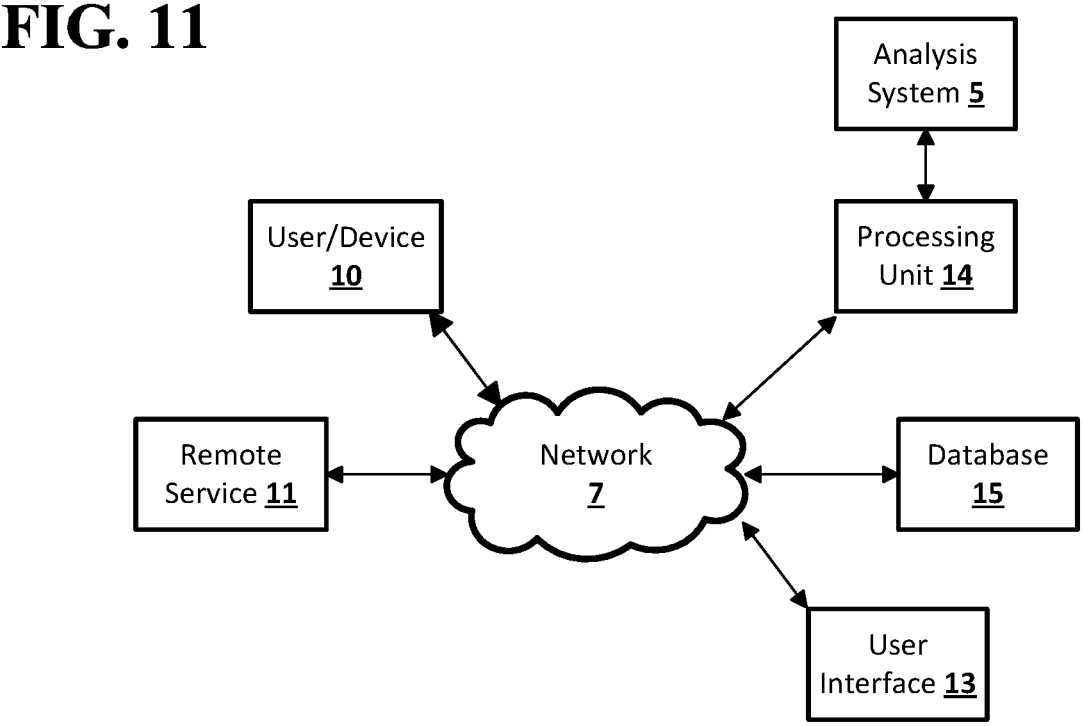
FIG. 11 shows a network configuration according to an embodiment of the disclosed subject matter.

FIG. 11 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. The disclosed subject matter also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions.

Implementations may use hardware that includes a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising;
obtaining, by one or more processors of a mobile computing device comprising a first antenna system for communicating over a first wireless link and a second antenna system for communicating over a second wireless link, a plurality of predefined beamforming configurations;
selecting, by the one or more processors and from the plurality of beamforming configurations, a beamforming configuration for the first antenna system based on a selected transmit power level, wherein the selected beamforming configuration for the first antenna system does not direct a beam through blackout regions for the second antenna system at the selected transmit power level;
configuring, by the one or more processors, the first antenna system in accordance with the selected beamforming configuration; and
communicating over the first wireless link using the configured first antenna system and over the second wireless link using the second antenna system, wherein communicating over the first wireless link comprises transmitting, via the first antenna system, one or more signals at the selected transmit power level.

2. The method according to claim 1, wherein the plurality of predefined beamforming configurations define different transmission and receiving angles for the beam of the first antenna system.

3. The method according to claim 1, wherein the first antenna system comprises an antenna array.

4. The method according to claim 1, wherein the first wireless link and the second wireless link correspond to different radio access networks.

5. The method according to claim 1, wherein the first wireless link operates in a frequency range above 24 GHz, and the second wireless link operates in a frequency range below 6 GHz.

6. The method according to claim 1, further comprising:
determining a signal strength indicator for each of the first and second wireless links, wherein the determined signal strength indicator for one of the first and second wireless links is a received signal strength indicator, and the determined signal strength indicator for the other one of the first and second wireless links is a transmission power.

7. A non-transitory computer-readable medium comprising computer-executable instructions that, when executed by one or more processors of a mobile computing device comprising a first antenna system for communicating over a first wireless link and a second antenna system for communicating over a second wireless link, cause the mobile computing device to:
select, based on a selected transmit power level, a beamforming configuration for the first antenna system from a plurality of predefined beamforming configurations, wherein the selected beamforming configuration for the first antenna system does not direct a beam through blackout regions for the second antenna system at the selected transmit power level;
configure the first antenna system in accordance with the selected beamforming configuration; and
communicate over the first wireless link using the configured first antenna system and over the second wireless link using the second antenna system, wherein the instructions that cause the mobile computing device to communicate over the first wireless link comprise instructions that cause the mobile computing device to transmit, via the first antenna system, one or more signals at the selected transmit power level.

8. A mobile computing device, comprising:
a first antenna system for communicating over a first wireless link;
a second antenna system for communicating over a second wireless link; and
a memory storing a plurality of beamforming configurations, wherein the mobile computing device is configured to:
select, based on a selected transmit power level, a beamforming configuration for the first antenna system from the plurality of predefined beamforming configurations, wherein the selected beamforming configuration for the first antenna system does not direct a beam through blackout regions for the second antenna system at the selected transmit power level;
configure the first antenna system in accordance with the determined beamforming configuration; and
communicate over the first wireless link using the configured first antenna system and over the second wireless link using the second antenna system, wherein, to communicate over the first wireless link, the mobile computing device is configured to transmit, via the first antenna system, one or more signals at the selected transmit power level.

9. The device according to claim 8, wherein the plurality of predefined beamforming configurations define different transmission and receiving angles for the beam of the first antenna system.

10. The device according to claim 8, wherein the first antenna system comprises an antenna array.

11. The device according to claim 8, wherein the first wireless link and the second wireless link correspond to different radio access networks.

12. The device according to claim 8, wherein the first wireless link operates in a frequency range above 24 GHz, and the second wireless link operates in a frequency range below 6 GHz.

13. The device according to claim 8, further adapted to:
determine a signal strength indicator for each of the first and second wireless links, wherein the determined signal strength indicator for one of the first and second wireless links is a received signal strength indicator, and the determined signal strength indicator for the other one of the first and second wireless links is a transmission power.

14. A method comprising:
providing a device having a first antenna system for communicating over a first wireless link and a second antenna system for communicating over a second wireless link; and
for each of a plurality of different transmit power levels of the first and/or second wireless links:
measuring an antenna coupling factor between the first antenna system and the second antenna system for each of a plurality of different beamforming configurations of the first antenna system;

measuring a received signal strength indicator (RSSI) of the first and/or second wireless link for each of the plurality of different beamforming configurations of the first antenna system; and storing, as a predefined beamforming configuration, each beamforming configuration at each of the plurality of different transmit power levels with the measured antenna coupling factor and the measured RSSI in a memory as a predefined beamforming configuration, wherein a portion of the predefined beamforming configurations define different transmission angles for the beam of the first antenna system and different transmit power levels of the first antenna system and are associated with the measurement of the coupling factor between the first antenna system and the second antenna system and the measurement of the RSSI of the second wireless link.

15. The method according to claim 14, wherein a portion of the predefined beamforming configurations define different receiving angles for the beam of the first antenna system and different transmit power levels of the second antenna system and are associated with the measurement of the antenna coupling factor between the first antenna system and the second antenna system and a measurement of the RSSI of the first wireless link.

16. The method according to claim 14, wherein a portion of the predefined beamforming configurations are designated as blackout regions based on the coupling factor between the first antenna system and the second antenna system and the RSSI of the first or second wireless link.

17. The method according to claim 16, wherein the transmission and receiving angles for the beam of a predefined beamforming configuration that is designated as a blackout region are a contiguous range of angles defined in 3-dimensional space.

* * * * *